A. C. SINCLAIR.
INTERNAL COMBUSTION ENGINE.
APPLICATION FILED AUG. 6, 1917.

1,431,188.

Patented Oct. 10, 1922.
5 SHEETS—SHEET 1.

Witness
Edgar M. Matthews

Inventor
Alfred C. Sinclair.

By
Hood & Sohly
Attorneys

Patented Oct. 10, 1922.

1,431,188

UNITED STATES PATENT OFFICE.

ALFRED C. SINCLAIR, OF INDIANAPOLIS, INDIANA, ASSIGNOR TO SINCLAIR ENGINE CORPORATION, OF INDIANAPOLIS, INDIANA, A CORPORATION OF WEST VIRGINIA.

INTERNAL-COMBUSTION ENGINE.

Application filed August 6, 1917. Serial No. 184,643.

*To all whom it may concern:*

Be it known that I, ALFRED C. SINCLAIR, a citizen of the United States, residing at Indianapolis, in the county of Marion and State of Indiana, have invented a new and useful Internal-Combustion Engine, of which the following is a specification.

It is the fundamental object of my invention to improve the internal combustion engine.

More specifically it is my object to provide an engine of greatly increased power and efficiency; which operates on a new cycle, whereby complete scavenging of the combustion chamber is obtained, with the resultant elimination of losses due to contamination of the explosive mixture; which is cooled internally after each explosion, so that the cooling is obtained from the hottest part of the engine; which has a main valve, preferably a sliding valve of the oscillating type, which valve is seated by pressure developed within the combustion chamber and is moved only when this pressure is relieved, the valve remaining stationary during compression and explosion, and other exhaust means being provided for obtaining such relief of pressure after the explosion; which provides large and unobstructed intake and exhaust ports, so that higher engine speeds may be obtained; which eliminates the depositing of carbon around the valves; which is substantially noiseless in its valve operations; which is of extreme lightness for the power which it develops; and, withal, which is simple in construction and of low manufacturing cost, and has all of its parts easily accessible.

In carrying out my invention, I operate on the four-stroke cycle, but at the end of the explosion period I open in quick succession (and preferably by uncovering them by the movement of the piston) an exhaust port through which the burned gases escape and an air-inlet port through which I inject into the combustion chamber a quantity of scavenging and cooling air under pressure, usually obtained from the crank case and preferably from the crank case sections for two cylinders so as to obtain an amount of air equal to twice the capacity of the combustion chamber, so that this scavenging and cooling air will drive out the remaining burned gases from the combustion chamber and absorb heat directly from the inside surfaces of the cylinder walls, where such walls are hottest; and the scavenging and cooling air which has taken the place of the burned gases in the cylinder is then forced out of the combustion chamber during what corresponds in the ordinary engine to the exhaust or scavenging piston stroke. As one fundamental feature of my invention, though other features of the invention can be practiced without using it, this final exhaust from the combustion chamber of the scavenging and cooling air and the inlet of the explosive mixture to the combustion chamber during the intake period are controlled by a sliding valve, preferably in the cylinder head and most conveniently an oscillating valve, which remains stationary in closed position during the compression and explosion periods, and is only moved—first to open and then to close the final exhaust ports, and second to open and then to close the explosive mixture inlet ports—during the exhaust and intake periods; the movement of this valve is desirably started only after the first exhaust of the burned gases has been obtained so that the pressure on the valve is relieved and the valve is moved only when it is under substantially no pressure. The scavenging and cooling air for each cylinder is obtained from the crank case section corresponding to that cylinder; and also in the case of multi-cylinder engines, from the crank case section corresponding to the cylinder at the directly opposite point in the cycle; in other words, for a two-cylinder engine the scavenging and cooling air for each cylinder is obtained from the crank case sections of both cylinders, and in a four or six-cylinder engine it is obtained for each cylinder as it completes its explosion stroke not only from the crank case section corresponding to that cylinder but from the crank case section corresponding to the cylinder which is just completing its intake stroke. The initial exhaust at the end of the explosion period and also the supply of scavenging and cooling air from the atmosphere to the crank case sections and from the crank case sections to the cylinders are controlled by an exhaust valve and by an air-inlet or distributing valve respectively; though in some forms of my invention the exhaust valve may be omitted, and in others both the exhaust valve and the usual form of intake valve may be omitted.

The accompanying drawings illustrate my invention, in its preferred form, for a four-cylinder engine, both water cooled and air cooled.

Figure 1:
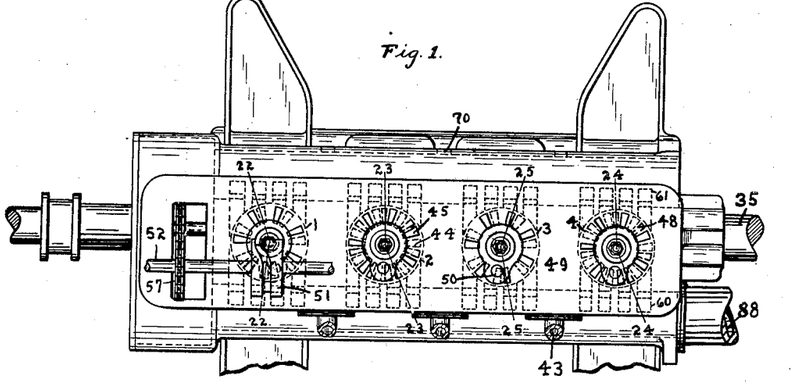
Fig. 1 is a plan of such a four-cylinder, water-cooled engine embodying my invention, with the cap and cam shaft broken away.
Figure 2:
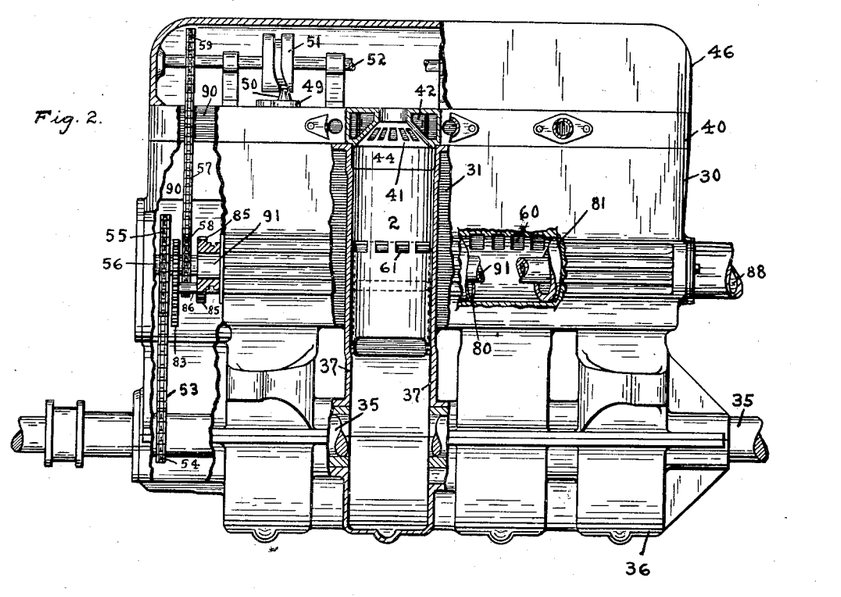
Fig. 2 is a side elevation of the engine shown in Fig. 1, with some parts broken away or in section and others completely removed, showing one cylinder in section, with its piston removed, and the exhaust valve casing in section opposite another cylinder.
Figures 3, 4, 5, 6, 7, 8, 9, 10, 11:
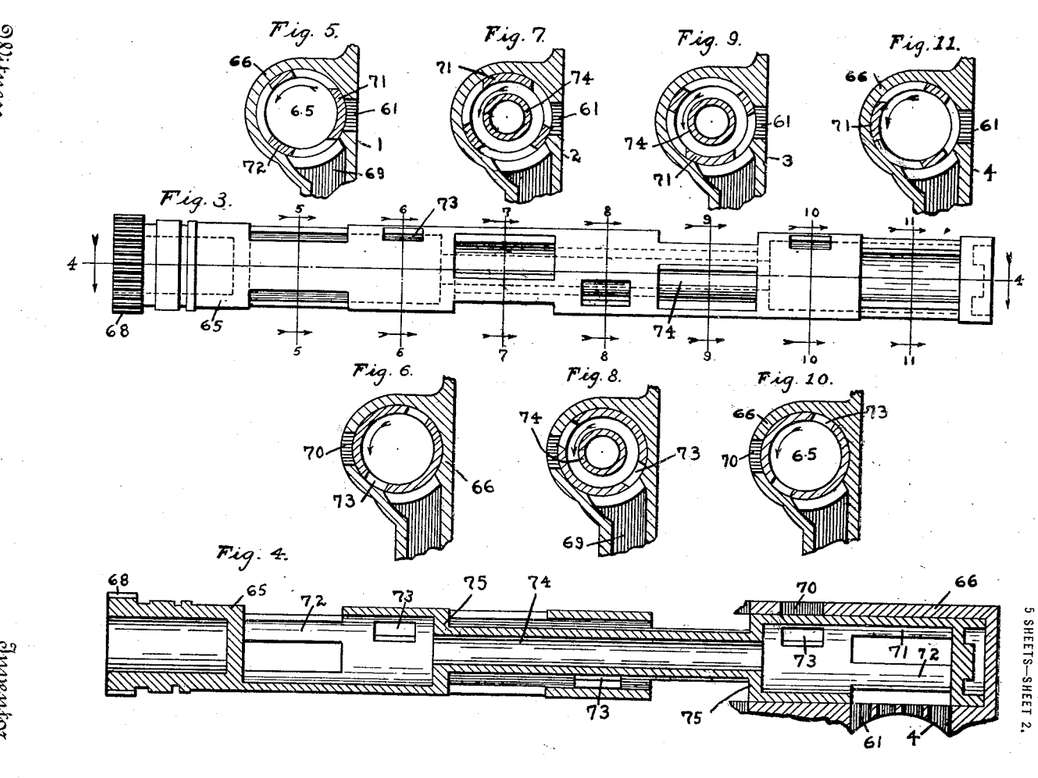
Fig. 3 is an elevation on a somewhat larger scale of the air-inlet valve.
Fig. 4 is a central longitudinal section through such valve, on the line 4—4 of Fig. 3, also showing part of the valve casing.
Figs. 5, 6, 7, 8, 9, 10, and 11 are sections on the lines 5—5, 6—6, 7—7, 8—8, 9—9, 10—10, and 11—11, respectively, of Fig. 3, also showing the valve casing.
Figure 12:
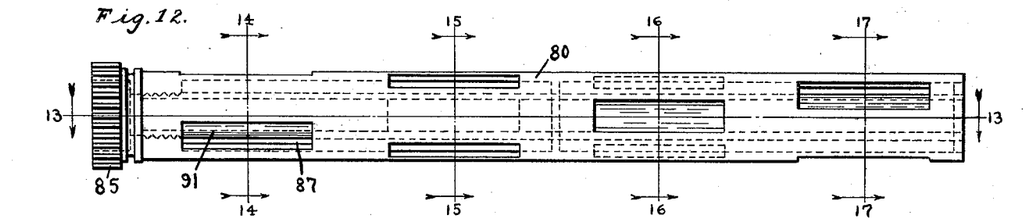
Fig. 12 is an elevation on substantially the same scale as Fig. 3 of the exhaust valve.

I have illustrated my invention in connection with a four-cylinder engine, though any number of cylinders may be used. These four cylinders 1, 2, 3, and 4 are shown as forming part of the main body casting 30, which in the water-cooled type of engine shown in Figs. 1 and 2 may be provided with any usual water jacket 31 and in the air-cooled type of engines shown in Figs. 22 to 25 inclusive may be provided with any suitable heat-radiating ribs 32. A piston 33 is mounted in each cylinder, and is connected by a connecting rod 34 to a crank shaft 35 mounted in a crank case at the bottom of the engine, such crank case conveniently being formed by the enlarged lower end of the main casting 30 and the lower mating part 36. The crank case is divided into sections by webs 37, one section for each cylinder, as is clear from Fig. 2, which sections are separated from each other by the webs 37 so as to form separate air-compressing compartments in which the air is compressed as the corresponding pistons move downward; though if desired the crank case sections for cylinders in which the pistons move correspondingly may be connected, as the crank case sections for the cylinders 2 and 3 are shown in Fig. 2, the pistons for the cylinders 2 and 3 moving together when the usual order of firing (1—3—4—2) is followed.

Figure 22:
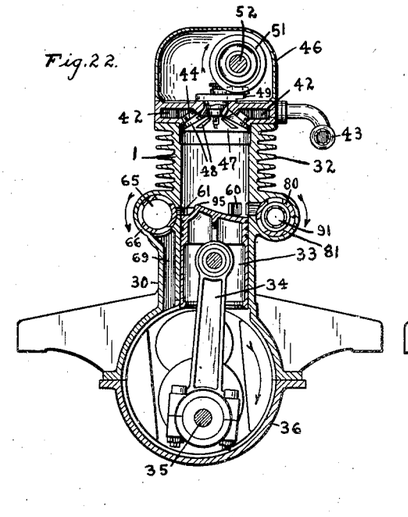
Figs. 22, 23, 24, and 25 are rather diagrammatic views showing approximately the condition of the various valves at the ends of the intake, compression, explosion, and exhaust piston strokes, in connection with an air-cooled motor, the sections through the valves in the cylinder heads being taken respectively to correspond with the lines 22—22, 23—23, 24—24, and 25—25 of Fig. 1, for the cylinders 1, 2, 4, and 3 respectively of a four-cylinder motor, though they also represent each cylinder at different quarters of its cycle.
Figure 23:
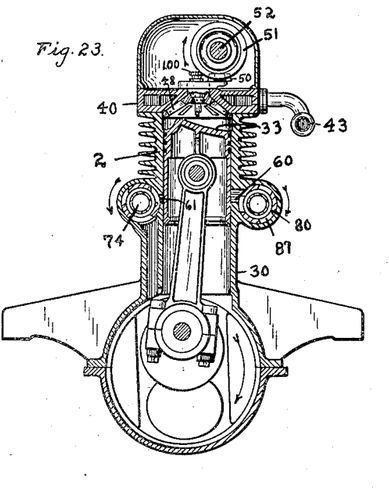
Figure 24:
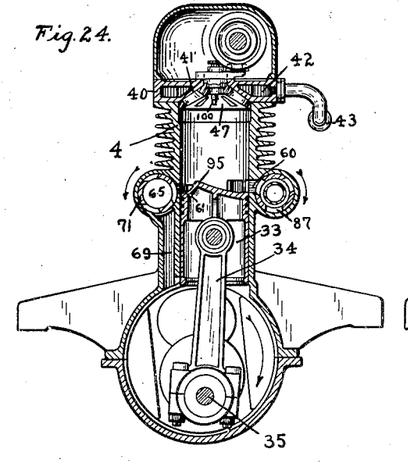

Mounted on the top of the main casting 30 is a cylinder head piece 40, which has an upwardly tapered valve seat 41 at the upper end of each cylinder, as is clear from Figs. 2 and 22 to 25 inclusive. The head piece 40 is cored to provide a chamber 42 within it, which chamber is connected by a pipe or pipes 43 to the carbureter or other source of explosive mixture. Each valve seat 41 is provided with a circumferential series of ports 44 and 45, arranged alternately in pairs, and leading respectively to the chamber 42 and through the head piece 40 into the space above said head piece 40 and beneath a cap 46, as is clear from Figs. 22 and 25. A valve 47 is mounted in each valve seat 41, so that it can oscillate therein on a vertical axis. This valve 47 is provided with a circumferential series of ports 48, corresponding in number to the number of pairs of ports 44 and 45. This number may vary, being shown as seven in Fig. 1 and six in Fig. 19. When the valve 47 is in an intermediate position the ports 48 are out of registry with both the ports 44 and 45 (Figs. 23 and 24). This is during the compression and explosion strokes, during which the valve 47 remains stationary in this position, and is held tightly against its seat by the pressure within the combustion space. The valve 47 is moved about its axis in one direction (clockwise in Figs. 1 and 19) from its intermediate positions during the exhaust period to bring the ports 48 into registry with the ports 45, to connect the combustion space of the associated cylinder with the space beneath the cap 45 (Fig. 25); and is moved about its axis in the other direction (counter clockwise in Figs. 1 and 19) from its intermediate position during the intake period to bring the ports 48 into registry with the ports 44, to connect such combustion space with the chamber 42 (Fig. 22) so that as the piston 33 moves downward explosive mixture may be drawn into such combustion space through the registering ports 44 and 48. However, the valve 47 is desirably not moved from its intermediate position to cause registry of the ports 48 and 45 until after the pressure within the combustion space has first been relieved at another point, in a manner to be described later, so that such movement of the valve may be when there is no substantial pressure upon it. This greatly facilitates the valve movement, even if it is not what makes it practicable.

Figures 18, 19, 20:
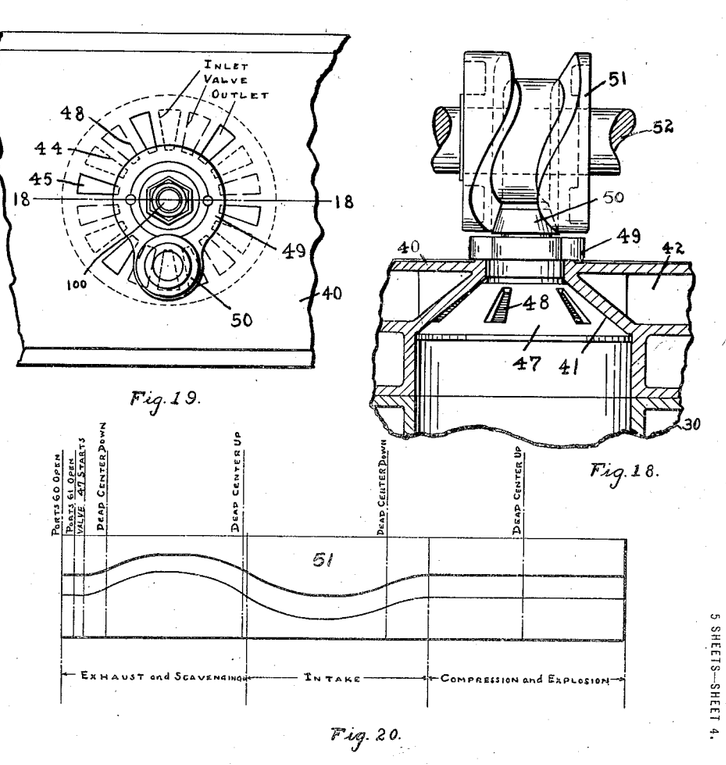
Fig. 18 is an enlarged vertical central section on the line 18—18 of Fig. 19 through one of the main oscillating valves in the cylinder head and the associated operating cam, showing it in closed position at the end of the explosion period just before it starts to open the final outlet ports (corresponding to Fig. 24)
Fig. 19 is a plan of the same valve.
Fig. 20 is a development of one of the valve-operating cams.

Each valve 47 is provided above the cylinder head piece 40 with a crank arm 49 which at its outer end carries a roller 50 located in the groove of a cam 51 mounted in common with corresponding cams for the other cylinders on a cam shaft supported in suitable bearings above the cylinder head piece 40 and beneath the cap 46. A development of one of these cams 51 is shown in Fig. 20, the cams being all alike, but being displaced from each other on the shaft 52 in accordance with the number of cylinders —or 90° in a four-cylinder engine shown— the displacement relative to the direction of motion of the shaft 52 being successively rearward in the order of firing. Each cam 51 has a straight portion which corresponds to the compression and explosion periods, and during which the exhaust valve remains stationary, and camming portions displaced in opposite axial directions from the straight portions and corresponding to the intake period and part of the exhaust period respectively, the straight portion continuing beyond the explosion period and part way into the exhaust period to correspond to the initial exhausting operation which occurs before the valve 47 is moved. The term "period" as thus used does not correspond to 180° of crank shaft movement, or to an exact stroke of a piston, because in the modern internal combustion engine the beginnings and endings of the various parts of the cycle do not occur at the exact ends of the piston strokes, by varying amounts, for reasons well understood.

Figure 21:
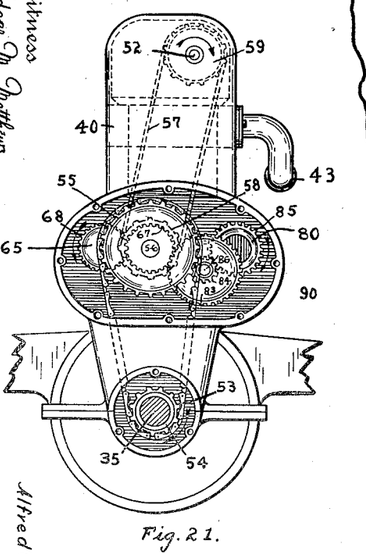
Fig. 21 is an end elevation of the engine of Fig. 1, with the casing partly broken away to show the driving connections for the various valves.

The cam shaft 52 is operated at one-half the speed of the crank shaft 35, being geared thereto in any suitable manner. A form of chain drive is shown in Fig. 21, where a chain 53 connects sprockets 54 and 55 on the crank shaft 35 and a countershaft 56 respectively, the sprockets 55 having twice the number of teeth of the sprockets 54 so that the countershaft 56 operates at half crank shaft speed, and a chain 57 connects sprockets 58 and 59 of equal number of teeth on the countershaft 56 and the cam shaft 52.

Each cylinder of the engine is provided with an arcuate series of exhaust ports 60 on one side and an arcuate series of air-inlet ports 61 on the other side. These ports are arranged so that they are covered by the piston during the larger part of the piston movement, but are uncovered when the piston approaches the lower limit of its movement. This uncovering occurs first for the exhaust ports 60, and very shortly afterward for the air-inlet ports 61, as is clear from Fig. 2 and Figs 22 to 25 inclusive. The uncovering of the exhaust ports 60 permits the exhaust of the burned gases from the combustion space, thus relieving the pressure tending to hold the valve 47 against its seat; and the uncovering of the ports 61 immediately following admits fresh air under pressure into the combustion space to scavenge and cool the latter, the fresh air thus admitted forcing out practically all the burned gases which are in such combustion space. These ports 60 and 61 may be large, so that the discharge of the burned gases and the scavenging may be very rapid. This also permits the explosion period to be lengthened in practice and the expansion of the gases to be carried farther, so that more of the energy of explosion may be given to the piston instead of being dissipated through the exhaust ports by reason of the high pressure of the exhaust gases. It also reduces the temperature of the burned gases before exhaust occurs, so that the cylinder walls may return to the burned gases part of the heat absorbed from them earlier in the explosion period and such heat may do useful work in addition to facilitating cooling.

The uncovering of both the ports 60 and 61, with the resultant scavenging, desirably occurs before the valve 47 is moved from its intermediate or closed position, as is clear from Fig. 24, so that when such valve is moved in its seat it will be with a minimum of friction—with substantially no friction due to pressure within the combustion space—and also so that the exhaust through the ports 45 into the space beneath the cap 46 will be substantially of air alone, substantially all of the burned gases having previously been discharged through the exhaust ports 60. This complete scavenging by the fresh air thus admitted prevents the contamination of the explosive mixture for one explosion by the burned gases from the preceding explosion, and results in a great increase in the power and efficiency of the engine. It also lessens very materially the deposit of carbon, (which is formed almost wholly when the explosive mixture is imperfect and the combustion is incomplete,) both because of the production of more complete combustion and the avoidance of the formation of carbonmonoxide and free carbon on account of incomplete combustion, and because the inflowing stream of air for a charge strikes the inner cylinder walls and the valve quite forcibly and blows away any particles of free carbon which might have been deposited during the previous stroke. Moreover, the fresh air admitted into the cylinder cools the walls of the cylinder from their inside surfaces, where they are hottest, thus producing the most effective cooling; and does so after and not during the explosion period, so that all obtainable heat is obtained when it is wanted inside the cylinder—that is during the explosion period. This internal air cooling is found to be exceedingly effective, so that in many forms of engines the water jacket such as 31 in Fig. 2 may be eliminated; indeed even the heat-radiating flanges 32, shown in Figs. 22 to 25 inclusive may in many instances be eliminated. However, I prefer to provide either a water jacket or heat-radiating flanges to supplement the internal air cooling though the latter produces the fundamental cooling.

The air for scavenging and cooling is supplied to the ports 61 of the various cylinders from the crank case sections, and in multi-cylinder engines the air from two crank case sections is supplied to each cylinder when it is scavenged, so that a quantity of air double the capacity of the cylinder is used for scavenging and the scavenging is thereby more complete. This double quantity of air is obtained because each piston on each downward stroke compresses the air in its crank case section, but the corresponding cylinder is scavenged only at the end of alternate downward strokes of its piston. Thus in the four-cylinder engine shown, cylinder 1 may be scavenged by air from the crank case sections for cylinders 1 and 4, cylinder 4 from the same crank case sections, and each of cylinders 2 and 3 from the crank case sections for both such cylinders. This is why it is possible to connect the crank case sections for cylinders 2 and 3, as shown, since the variations in pressure in such crank case sections correspond.

In order to control the supply of air from the atmosphere to the crank case sections and from the crank case sections to the cylinders through the ports 61, I provide an air-inlet or distributing valve 65, shown in detail in Figs. 3 to 11 inclusive. In the four-cylinder engine shown, with the cylinders all in alinement, this distributing valve 65 extends along one side of the row of cylinders, parallel to the crank shaft, within a valve casing 66 in which it is rotatably mounted. The valve 65 is rotated at half crank shaft speed, as by being connected by gears 67 and 68, of equal size to the countershaft 56, as is clear from Fig. 21. Into this valve casing 66 open the outer ends of the air-inlet ports 61 of all the cylinders. A passage 69 for each cylinder connects such valve casing and the corresponding crank case section, being located in the same plane transverse to the crank shaft as is the corresponding cylinder and crank case section. Ports 70 to the atmosphere are provided in the crank case section 66 in planes which alternate with those of the passages 67. The valve 65 is largely cut away in the plane of each cylinder, leaving merely a port-closing strip 71 which closes the associated ports 61 during the time they are uncovered at the end of the intake piston stroke, as is clear from Figs. 5 and 22, and other and usually narrower strips 72 for purposes of strength. The strips 71 for the different cylinders are angularly displaced in the same way as are the corresponding cams 51, or in the four-cylinder engine shown successively 90° rearward in the order of firing. The openings from the valve casing 66 to the passage 69 are so wide that they are never closed by any of these strips. The valve 65 in provided in the plane of each atmosphere port 70 with two diametrically opposite apertures 73, which register with the corresponding ports 70 during the upward strokes of the pistons whose corresponding crank cases are supplied through such ports 70. In the four-cylinder engine shown the end ones of the three ports 70 supply the crank case sections for cylinders 1 and 4 and the middle port 70 supplies the crank case sections for both cylinders 2 and 3, as is clear from Figs. 4, 6, 8, and 10. To provide for this, the middle portion of the valve 65 has an inner tube 74 which is supported at its ends by webs 75 projecting inward from the valve tube proper. This tube and the webs separate the valve into two distinct parts. One comprises the openings for the ports 61 and passages 69 of the cylinders 2 and 3 and the apertures 73 for the atmosphere port 70 between the cylinders 2 and 3, which are connected through the annular space around the inner tube 74 and between the webs 75. The other comprises the openings for the ports 61 and passages 69 of the cylinders 1 and 4 and the apertures 73 for the end atmosphere ports 70, which are connected through the tube 74. By this arrangement, when the pistons of cylinders 2 and 3 move upward (one on the compression stroke and the other on the exhaust stroke), they draw in air from the atmosphere through the middle atmosphere port 70, one of the associated apertures 73, and the passages 69 for the cylinders 2 and 3 into the crank case sections for such cylinders; and when these pistons move downward (one on the explosion stroke and the other on the intake stroke), they compress in the associated crank case sections the air which has thus been drawn in, and when they near the end of such downward stroke and have uncovered the ports 61 this compressed air is forced into either cylinder 2 or 3, the one which is at the end of its explosion stroke being prevented from entering the other of such cylinders (which is at the end of its intake stroke) by the closing of the ports 61 thereof by the strip 71. Corresponding actions take place for the crank case sections for the cylinders 1 and 4, by virtue of the connection through the pipe 74.

Figure 14:
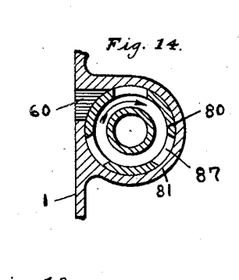
Figs. 14, 15, 16, and 17 are sections on the lines 14—14, 15—15, 16—16, and 17—17, respectively, of Fig. 12, also showing the valve casing.
Figure 15:
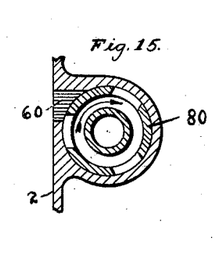
Figure 16:
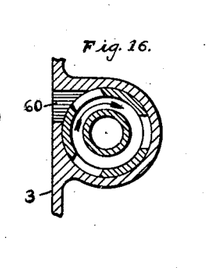
Figure 17:
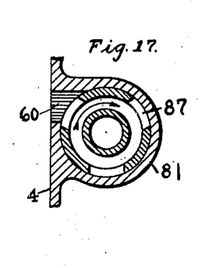

I provide an exhaust valve 80 for controlling the exhaust ports 60, especially if there is any overlapping of exhaust periods of the various cylinders as is the case in the ordinary multi-cylinder engine, though I may omit this exhaust valve completely in the event that any cylinders whose exhaust periods overlap discharge through different passages to the atmosphere. In the four-cylinder engine shown, where the exhaust periods do overlap, I provide such an exhaust valve 80 extending along the row of cylinders on the opposite side thereof from the air inlet or distributing valve 65, such valve being mounted to rotate in a valve casing 81 into which the exhaust ports 60 open. The exhaust valve 80 is preferably operated at some exact odd fractional part of the speed of the air-inlet valve 66, such as one-third or one-fifth thereof; as shown, it is driven at one-third the speed of the valve 65, as shown in Fig. 21, by means of gears 67, 83 and 84, and 85, on the countershaft 56, a stud shaft 86, and the valve 80 respectively, such gears having the proper numbers of teeth so that this gear ratio is obtained. Opposite the set of ports 60 for each cylinder, the valve 85 is provided with three apertures 87, one of which registers with its associated set of exhaust ports as the corresponding cylinder reaches the end of its explosion period, as shown in Figs. 17 and 24. The next aperture 87 in the same group serves for the exhaust operation at the end of the next explosion, because the exhaust valve 80 moves but a third of a rotation during each engine cycle. When the ports 60 are uncovered at the end of the next downward stroke of the piston, (which is at the end of the intake stroke,) all the apertures 87 are completely out of registry with the ports 60, as indicated in Figs. 14 and 22, so that there can be no possibility of back flow of burned gases through the ports 60 into the cylinder at this time, when it contains an uncontaminated charge of explosive mixture ready for compression. The exhaust valve 65 is open at the end opposite the gear 85, and there discharges into the exhaust manifold 88, which disposes of the burned gases in any suitable way.

Figure 13:
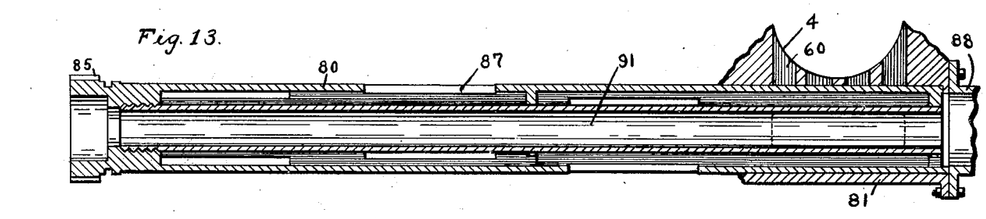
Fig. 13 is a central longitudinal section through such exhaust valve, on the line 13—13 of Fig. 12, also showing part of the valve casing.
Figure 25:
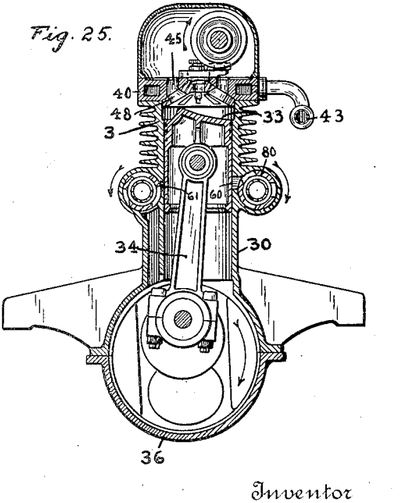

The scavenging and cooling air which is discharged from each cylinder during the exhaust stroke of the piston, as indicated in Fig. 25, is carried within the cap 46 to the front end of the engine, (the left in Figs. 1 and 2,) and is then carried downward through the chamber 90 in which the gearing connecting the crank shaft, the cam shaft, the air inlet or distributing valve, and the exhaust valve is located, and near the bottom this chamber communicates with one end of a central tube 91 mounted within the exhaust valve 85 (see Fig. 13) so that this scavenging and cooling air may then pass from the chamber 90 through this tube 91 into the exhaust manifold 88. The flow of this scavenging and cooling air from the tube 91 into the exhaust manifold 88 assists in the exhaust of the burned gases from the cylinders through the ports 60, by an ejector action. In addition, the scavenging and cooling air mixes with the burned gases in the exhaust manifold 88, and thereby diminishes the temperature of the gases in the exhaust manifold.

In order to get the proper scavenging action in the cylinders, the upper face of each piston 33 is provided with a cross ridge 95 transverse to the ports 60 and 61, so that the fresh air entering by the ports 60 is deflected to the upper end of the cylinder, along the sides of the cylinder wall so as to force out the gases from such upper end, which descending strike the piston on the other side of the ridge 95 and are deflected into the exhaust ports 60. I have found that the best scavenging is obtained if the ridge 95 is located rather close to the ports 61.

The spark plug for obtaining ignition is preferably mounted axially in the valve 47 of each cylinder. This gives a central starting point for the propagation of the flame. The upper end of this spark plug 100 may project into the groove of the corresponding cam 51, but this does not interfere with the action of the cam.

In operation, the valve 47 of each cylinder is moved by its cam 51 to the position shown in Fig. 22 during the intake period, so that by the registry of the ports 48 and 44 explosive mixture may be drawn from the chamber 42 into the combustion chamber of that cylinder. At the end of the intake period, the cam 51 moves the valve 47 to closed position, and the upward movement of the piston 33 compresses the explosive mixture which has thus been drawn in. Explosion occurs when the compression is completed, and forces the piston downward. During compression and explosion the valve 47 remains stationary, in closed position. As the piston 33 nears the end of its explosion stroke, it uncovers the ports 60 to permit the burned gases to escape through the exhaust valve 85 into the exhaust manifold 88, first by the remaining pressure of such burned gases; and immediately thereafter it uncovers the ports 61 to admit air through the passages 69 into the cylinder to push out the burned gases through the ports 60, thereby producing a thorough scavenging and an effective cooling. The air thus injected into the cylinder is obtained from the crank case sections of that cylinder and also of the cylinder in which the piston is just reaching the end of its intake stroke. This injection of twice the quantity of fresh air into the cylinder drives out practically all the burned gases from the cylinder. After the pressure within the combustion chamber has been relieved during this exhausting and scavenging action, the cam 51 turns the valve 47 (which has desirably remained stationary in closed position until then) to the position shown in Fig. 25, to bring the ports 48 and 45 into registry, so that as the piston 33 now ascends it may force out from the cylinder nearly the whole of the remainder of the scavenging and cooling air, which passes into the space beneath the cap 46, down through the chamber 90, and through the pipe 91 into the exhaust manifold 88, assisting in the initial exhaust from the exhaust ports 60 for the cylinder next in the firing order and cooling the exhaust. At the end of the scavenging stroke of the piston, the cam 51 turns the valve 48 back through its intermediate position to its intake position, with the ports 48 in registry with the ports 44, whereupon the cycle just described is repeated.

By turning the valve 47 only when it is substantially under no pressure, such turning is made relatively frictionless, and may be easily obtained. By obtaining the complete scavenging, the power and efficiency of the engine are greatly increased.

I claim as my invention:

1. A four-stroke cycle internal combustion engine, comprising a cylinder and piston, said cylinder being provided with valved intake and exhaust ports in the cylinder head, the wall of said cylinder being provided with a supplemental exhaust port and a scavenging air admission port arranged so that they are uncovered by the piston at the end of the explosion period, and means whereby said scavenging air-admisison port when it is uncovered at the end of the explosion period is open to a quantity of air the volume of which has been compressed by substantially double the capacity of the cylinder.

2. A four-stroke cycle internal combustion engine, comprising a cylinder and piston provided between them with valved intake and exhaust ports, a sliding valve controlling said exhaust port, the wall of said cylinder being provided with a supplemental exhaust port and a scavenging air admission port arranged so that they are uncovered by the piston at the end of the explosion period, and means for operating said valve, said valve-operating means permitting said valve to remain stationary in closed position during the compression and explosion periods and until after the pressure with the cylinder has been relieved by the uncovering of said supplemental exhaust port at the end of the explosion period.

3. A four-stroke cycle internal combustion engine, comprising a cylinder and piston provided between them with intake and exhaust ports, a sliding valve controlling said ports, the wall of said cylinder being provided with a supplemental exhaust port and a scavenging air admission port arranged so that they are uncovered by the piston at the end of the explosion period, and means for operating said valve, said valve-operating means permitting said valve to remain stationary in closed position during the compression and explosion periods and until after the pressure within the cylinder has been relieved by the uncovering of said supplemental exhaust port at the end of the explosion period.

4. A four-stroke cycle internal combustion engine, comprising a cylinder and piston provided between them with intake and exhaust ports, an oscillating valve having an intermediate closed position and two end positions in which it opens said intake and exhaust ports respectively, the wall of said cylinder being provided with a supplemental exhaust port and a scavenging air admission port arranged so that they are uncovered by the piston at the end of the explosion period, and means for operating said valve, said valve-operating means permitting said valve to remain stationary in closed position during the compression and explosion periods and until after the pressure within the cylinder has been relieved by the uncovering of said supplemental exhaust port at the end of the explosion period.

5. A four-stroke cycle internal combustion engine, comprising a cylinder and piston provided between them with an exhaust port at an axial end of the combustion space and with an intake port and a supplemental exhaust port and a scavenging air admission port the last two of which are so arranged that they are successively opened at the end of the explosion period, said supplemental exhaust port being opened before said first named exhaust port is opened, and a sliding valve controlling said first named exhaust port and pressed against its seat by the pressure within said combustion space, said valve remaining stationary during compression and explosion and until after said supplemental exhaust port has been opened.

6. A four-stroke cycle internal combustion engine, comprising a cylinder and piston provided between them with an exhaust port at an axial end of the combustion space and with an intake port and a supplemental exhaust port and a scavenging air admission port the last two of which are so arranged that they are opened at the end of the explosion period, said supplemental exhaust port being opened before said first named exhaust port is opened, and a sliding valve controlling said first named exhaust port and pressed against its seat by the pressure within said combustion space, said valve remaining stationary during compression and explosion and until after said supplemental exhaust port has been opened.

7. A four-stroke cycle internal combustion engine, comprising a cylinder and piston provided between them with an exhaust port at an axial end of the combustion space and with an intake port and a supplemental exhaust port the last named of which is so arranged that it is opened at the end of the explosion period, said supplemental exhaust port being opened before said first named exhaust port is opened, and a sliding valve controlling said first named exhaust port and pressed against its seat by the pressure within said combustion space, said valve remaining stationary during compression and explosion and until after said supplemental exhaust port has been opened.

8. A four-stroke cycle internal combustion engine, comprising a pair of cylinders and their associated pistons; means whereby air is compressed by the movements of both pistons during the explosion stroke of one; and means operating at the end of the explosion period in that cylinder for permitting the escape from such cylinder of the burned gases from the explosion in such cylinder and for opening such cylinder as the sole outlet for the compressed air compressed by both pistons so that such burned gases are displaced by such compressed air and so that the gas which is forced from that cylinder during the exhaust piston stroke of its piston and the gas remaining in the combustion space thereof at the end of such exhaust piston stroke will be air.

9. A four-stroke cycle internal combustion engine, comprising a cylinder, a piston, and a crank case, said cylinder and piston being provided between them with valved intake and exhaust ports and a scavenging air admission port and a valve outside said cylinder and controlling the connection of said crank case to the atmosphere and to said scavenging air admission port to admit air to the crank case during the compression and exhaust periods, to prevent the escape of such air from the crank case during the explosion period so that such air is compressed in the crank case, to admit the air thus compressed from the crank case through such scavenging air admission port into the cylinder at the end of the explosion period, and to prevent the flow of air from the crank case to the cylinder at the end of the intake period.

10. A four-stroke cycle internal combustion engine, comprising a pair of cylinders, pistons therefor, said two pistons being at substantially opposite points of the cycle, and a crank case, each cylinder and its piston being provided between them with valved intake and exhaust ports and with a supplemental exhaust port and a scavenging air admission port, and a valve controlling the connection of said crank case to the atmosphere and to said scavenging air admission ports of both cylinders to admit air to the crank case during the compression period of each of said cylinders, to prevent the escape of such air from the crank case during the explosion period of each of said cylinders so that such air is compressed in the crank case by the movements of both pistons, and at the end of the explosion period of each cylinder to admit from the crank case through the proper scavenging air admission port into that cylinder and prevent from entering the other cylinder air which has been thus compresed in the crank case by the movements of both said pistons.

11. A four-stroke cycle internal combustion engine, comprising a pair of cylinders, pistons therefor, said two pistons being at substantially opposite points of the cycle, and a crank case, each cylinder and its pistons being provided between them with valved intake and exhaust ports and a scavenging air admission port, and a valve controlling the connection of said crank case to the atmosphere and to said scavenging air admission ports of both cylinders to admit air to the crank case during the compression period of each of said cylinders, to prevent the escape of such air from the crank case during the explosion period of each of said cylinders so that such air is compressed in the crank case by the movements of both pistons, and at the end of the explosion period of each cylinder to admit from the crank case through the proper scavenging air admission port into that cylinder and prevent from entering the other cylinder air which has been thus compressed in the crank case by the movements of both said pistons.

12. A four-stroke cycle internal combustion engine, comprising a pair of cylinders, pistons therefor, said two pistons being at substantially opposite points of the cycle, and a crank case, each cylinder and its piston being provided between them with valved intake and exhaust ports and with a supplemental exhaust port and a scavenging air admission port, said last two ports being arranged so that they are uncovered by the piston at the ends of the explosion and intake periods, and a valve controlling the connection of said crank case to the atmosphere and to said scavenging air admission ports of both cylinders to admit air to the crank case during the compression period of each of said cylinders, to prevent the escape of such air from the crank case during the explosion period of each of said cylinders so that such air is compressed in the crank case by the movements of both pistons, and at the end of the explosion period of each cylinder to admit from the crank case through the proper scavenging air admission port into that cylinder and prevent from entering the other cylinder air which has been thus compressed in the crank case by the movements of both said pistons.

13. A four-stroke cycle internal combustion engine, comprising a pair of cylinders, pistons therefor, said two pistons being at substantially opposite points of the cycle, and a crank case, each cylinder and its piston being provided between them with valved intake and exhaust ports and with a supplemental exhaust port and a scavenging air admission port, said last two ports being arranged so that they are uncovered by the piston at the ends of the explosion and intake periods, a valve controlling the connection of said crank case to the atmosphere and to said scavenging air admission ports of both cylinders to admit air to the crank case during the compression period of each of said cylinders, to prevent the escape of such air from the crank case during the explosion period of each of said cylinders so that such air is compressed in the crank case by the movements of both pistons, and at the end of the explosion period of each cylinder to admit from the crank case through the proper scavenging air admission port into that cylinder and to prevent from entering the other cylinder air which has been thus compressed in the crank case by the movements of both said pistons, and an exhaust valve for closing said supplemental exhaust port when it is uncovered at the end of the intake period.

14. A four-stroke cycle internal combustion engine, comprising a cylinder and piston provided between them with valved intake and exhaust ports, a sliding valve controlling said exhaust port, the wall of said cylinder being provided with a supplemental exhaust port and a scavenging air admission port arranged so that they are uncovered by the piston at the end of the explosion period, means for operating said valve, said valve-operating means permitting said valve to remain stationary in closed position during the compression and explosion periods, and a separate valve for said supplemental exhaust port.

15. A four-stroke cycle internal combustion engine, comprising a cylinder and piston provided between them with intake and exhaust ports, a sliding valve controlling said ports, the wall of said cylinder being provided with a supplemental exhaust port and a scavenging air admission port arranged so that they are uncovered by the piston at the end of the explosion period, means for operating said valve, said valve-operating means permitting said valve to remain stationary in closed position during the compression and explosion periods, and a separate valve for said supplemental exhaust port.

16. A four-stroke cycle internal combustion engine, comprising a cylinder and piston provided between them with valved intake and exhaust ports, a sliding valve controlling said exhaust port, the wall of said cylinder being provided with a supplemental exhaust port and a scavenging air admission port arranged so that they are successively uncovered by the piston at the end of the explosion period, and means for operating said valve, said valve-operating means permitting said valve to remain stationary in closed position during the compression and explosion periods and until after the pressure within the cylinder has been relieved by the uncovering of said supplemental exhaust port at the end of the explosion period.

17. A four-stroke cycle internal combustion engine, comprising a cylinder and piston provided between them with intake and exhaust ports, a sliding valve controlling said ports, the wall of said cylinder being provided with a supplemental exhaust port and a scavenging air admission port arranged so that they are successively uncovered by the piston at the end of the explosion period, and means for operating said valve, said valve-operating means permitting said valve to remain stationary in closed position during the compression and explosion periods and until after the pressure within the cylinder has been relieved by the uncovering of said supplemental exhaust port at the end of the explosion period.

18. A four-strike cycle internal combustion engine, comprising a cylinder and piston provided between them with valved intake and exhaust ports, a sliding valve controlling said exhaust port, the wall of said cylinder being provided with a supplemental exhaust port and a scavenging air admission port arranged so that they are successively uncovered by the piston at the end of the explosion period, means for operating said valve, said valve-operating means permitting said valve to remain stationary in closed position during the compression and explosion periods, and a separate valve for said supplemental exhaust port.

19. A four-stroke cycle internal combustion engine, comprising a cylinder and piston provided between them with intake and exhaust ports, a sliding valve controlling said ports, the wall of said cylinder being provided with a supplemental exhaust port and a scavenging air admission port arranged so that they are successively uncovered by the piston at the end of the explosion period, means for operating said valve, said valve-operating means permitting said valve to remain stationary in closed position during the compression and explosion periods, and a separate valve for said supplemental exhaust port.

20. An internal combustion engine, comprising a cylinder and piston, an oscillating valve mounted in the cylinder head and pressed to its seat by the pressure developed within the combustion chamber, said valve controlling intake and exhaust ports for the cylinder, the wall of said cylinder being provided with a supplemental exhaust port and a scavenging air admission port which are uncovered by the piston at the end of the explosion period, and operating means for said oscillating valve, said operating means acting to hold said valve stationary during the compression and explosion periods and sion period, means for operating said valve, to operate said valve wholly during the exhaust and intake periods, and a separate valve controlling said supplemental exhaust port.

21. A four-stroke cycle internal combustion engine, comprising a cylinder, a piston, and a unitary valve controlling intake and exhaust ports of said cylinder, the wall of said cylinder being provided with a supplemental exhaust port and a scavenging air admission port which are uncovered by the piston at the end of the explosion period, said valve being stationary during the compression and explosion periods and until after said supplemental exhaust port has been uncovered.

In witness whereof, I have hereunto set my hand at Indianapolis, Indiana, this A. D. one thousand nine hundred and seventeen.

ALFRED C. SINCLAIR.